Feb. 16, 1932.  B. L. BROWNING  1,845,231
METHOD OF ASCERTAINING THE AMOUNT OF COATING ON MATERIAL
Filed Nov. 20, 1929
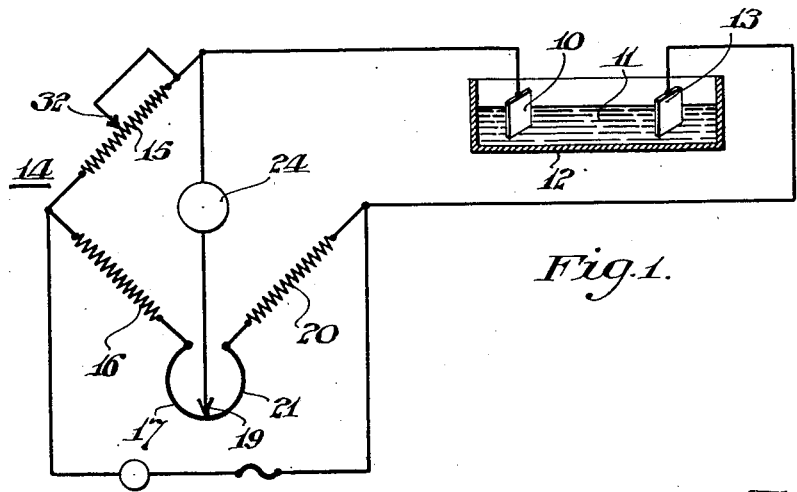
Fig.1.
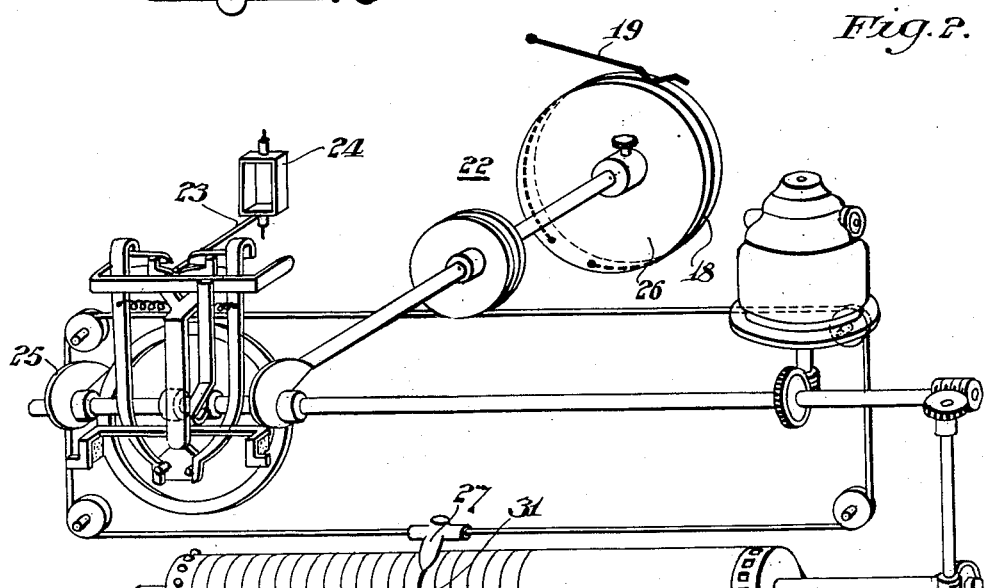
Fig.2.
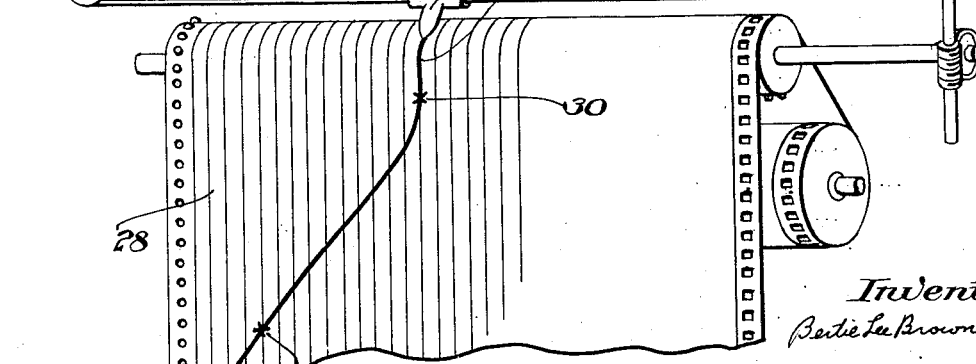
Inventor
Bertie Lee Browning
By
Cornelius D. Ehret
Attorney.

Patented Feb. 16, 1932

1,845,231

UNITED STATES PATENT OFFICE

BERTIE LEE BROWNING, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA

METHOD OF ASCERTAINING THE AMOUNT OF COATING ON MATERIAL

Application filed November 20, 1929. Serial No. 408,599.

My invention relates to improvements in method of an apparatus for ascertaining the amount of coating on material.

In accordance with my invention, the material is disposed in an electrical circuit and variations in current conditions in the circuit observed as the amount of coating on the material varies.

Further in accordance with my invention, means are provided for automatically making a record representative of conditions as regards the amount of coating on the material and the rate of variation in amount of the coating.

Further in accordance with my invention, two electrodes are placed in an acid pickling bath, one of the electrodes being material such as steel covered with rust or scale. The conductance of the bath at the beginning of the pickling process is low due to the low conductivity of the scale. As the scale is removed, the conductance of the bath increases because of the increase in effective area of the electrode, and such increase ceases when the scale has been entirely removed. By recording the relative values of conductance of the bath during the pickling process, and observing the nature of the record, the time or point at which all the rust or scale has been removed is determined.

In practice steel is pickled in a bath of hot, dilute sulfuric acid. The rust and scale is insoluble in the acid and is removed by the acid attacking the metal underneath, the evolved hydrogen assisting in mechanically removing the scale. The time necessary to complete the process depends on the temperature of the bath, its acid and ferrous sulfate content, the condition of the steel, etc., these being factors which cannot all be controlled, or even determined. Consequently, in order to make certain that the pickling process is complete, it has been necessary heretofore to leave the steel in the bath much longer than required, with resultant waste of acid and the steel dissolved by it.

My invention resides in the method and features of structure and combination of the character hereinafter described and claimed.

For the purpose of illustrating the present invention, one embodiment thereof is shown in the drawings, in which Figure 1 is a diagrammatic view of a system embodying the present improvements; and Figure 2 is an enlarged, fragmentary, perspective view of apparatus forming part of the system of Fig. 1.

The system disclosed provides means for determining when the coating of rust or scale is removed from material such as sheet steel or wire which is being pickled. To this end, the coated material 10 is placed in a bath 11 of hot, dilute sulphuric acid contained by tank 12. An electrode 13 is also placed in the bath. The electrode comprised of the coated material 10 and the electrode 13 are connected as shown in one arm of the Wheatstone bridge indicated generally by reference numeral 14 and connected as shown to a suitable source of electrical supply. In the system disclosed, the electrical supply for the Wheatstone bridge is indicated as being a source of alternating current, the supply lines being connected to conjugate points of the bridge different than the conjugate points to which galvanometer 24 is connected. The resistance 15 constitutes a second arm of the bridge, while the resistance 16 and that portion 17 of resistance element 18 to the left of contact 19 constitutes a third arm. The resistance 20 and that portion 21 of resistance element 18 to the right of contact 19 constitutes the fourth arm of the bridge.

The construction and manner of operation of the apparatus shown in Fig. 2, and indicated generally by reference numeral 22, is well known, and is explained in detail in Patent No. 1,472,125 of October 30, 1923, to Keeler and Patent No. 1,125,699 of January 19, 1915, to Leeds. The action, generally, is such that upon unbalancing of bridge 14, the needle 23 of galvanometer 24 deflects in one direction or the other and in amount depending upon the degree of unbalance. Such deflection of needle 23 operates through the mechanism 25 to impart rotary movement to disc 26 such that contact 19 engages resistance element 18 at a new point whereat the bridge is again in balance. Such movement of disc 26 is accompanied by corresponding movement of the marker or stylus 27 in a direction transverse to the direction of movement of the recorder paper 28.

At the beginning of the pickling process the measured conductance of the pickling bath will be relatively low, since the coating of rust or oxide layer on the steel material is a poor electrical conductor. As the coating or scale is removed from the metal, the measured conductance of the bath increases in accordance with the increase in area of effective exposed surface of the metal. When the scale or coating is entirely removed, or, in other words, when the entire surface of the submerged material is exposed, the measured conductance of the bath remains constant.

It will be assumed that as the measured conductance of the bath increases to unbalance the bridge, and cause the accompanying rotary movement of disc 26 to rebalance the bridge, marker 27 is moved to the right. As the coating or scale is removed from the metal, therefore, there is recorded that portion of the graphical record between the point 29 representing the beginning of the process and point 30 representing the end of the process whereat all the coating or scale has been removed and the measured conductance of the bath remains constant. Continuation of the pickling process results in eating away of the metal, but such action causes no variation in the measured conductance of the bath, and marker 27 accordingly remains stationary so that the portion 31 of the graphical record beyond point 30 is straight.

The graphical record, therefore, provides an indication as to the manner in which the pickling action is progressing, and when the coating or scale has been substantially completely removed.

The electrode 13 may be an electrical conductor which is resistive to the acid bath, or it may be another specimen of the material which is being pickled, such as the coated material constituting electrode 10.

The starting point 29 of the graphical record may be shifted or positioned as desired on the record paper by adjusting contact 32 associated with resistance 15.

From the foregoing it will be seen that in the improved method disclosed for ascertaining as to the amount of coating on a surface of material having appreciable electrical conductivity and wherein the conductivity of the material is different than that of the coating, and the amount of the coating on the material varies, the material is subjected to an electromotive force, and observations made of occurring changes in the conductivity of the coated material consequent to variations in the amount of the coating.

It will be seen, further, that in the apparatus disclosed the acid bath constitutes means providing for variation in the amount of coating on a metallic surface, that the Wheatstone bridge provides an electrical circuit which is subject to conditions of electrical conductivity of the coated metal, and that galvanometer 24, marker 27, recorder paper 28 and associated parts constitute means responsive to current conditions in said circuit and operable to provide indications corresponding to such conditions.

By means of the apparatus disclosed, the time or point at which all of the scale or oxide coating has been removed from the steel can be positively determined, so that the operator can judge when to remove the pickled steel to prevent unnecessary consumption of the acid and loss of steel.

While the indicating action in the disclosed embodiment of the present invention is induced by physical change in the material being treated, such change being in the nature of removal of a coating from the material, the invention is of much broader adaptation, and may be embodied in systems wherein the action is reversed, that is, wherein the indicating action is induced by physical change in the material being treated which is in the nature of application of a coating to the material. For example, my method and apparatus may be utilized in electrodeposition or similar operation of applying a coating to a material, to indicate when the coating shall have completely covered the material or shall have attained to a predetermined amount.

The invention claimed is:

1. The method of determining the time for removal of a coated body from an electrolyte, the materials of said body and of its coating having substantially different electrical conductivities, which comprises passing an electric current through a path including said coated body and the electrolyte, measuring the magnitude of said current, and noting the time of occurrence of a substantial change in the rate of change of said current.

2. The method of determining the time of substantial completion of removal of a coating of material of low electrical conductivity from a body of material of higher electrical conductivity by chemical action of an electrolyte, which comprises passing an electric current through a path including said coated body and said electrolyte, measuring the magnitude of current, and noting the time of abrupt decrease in the rate of increase of said current.

3. The method of determining the time of substantially complete removal of scale from a metallic body by a pickling liquid, which comprises passing an electric current through a path including said coated body and said liquid, measuring the magnitude of said current, and noting the time of abrupt decrease in the rate of increase of said current.

4. The method of determining the time for removal of a coated body from an electrolyte, the materials of said body and of its coating having substantially different electrical conductivities, which comprises passing an alternating current through a path including said coated body and said electrolyte, measuring the magnitude of said alternating current, and noting the time of occurrence of a substantial change in the rate of change of said alternating current.

5. The method of determining the time of substantially complete removal of scale from a metallic body by a pickling liquid, which comprises passing an alternating current through a path including said body and said liquid, measuring the magnitude of said alternating current, and noting the time of abrupt decrease in the rate of increase of said alternating current.

6. The method of determining the time of cessation in change of the area of a coating upon a body, the coating and body differing substantially in electrical conductivity, which comprises including said body and liquid in an electrical network, balancing said network by variation of impedance, and noting the time at which the network remains balanced without further variation of said impedance.

7. The method of pickling to remove scale from a metallic body by chemical action of a liquid, which comprises passing an electric current through a path including said body and said liquid, measuring the magnitude of said current, and interrupting the pickling upon decrease in the rate of increase of the current.

BERTIE LEE BROWNING.